United States Patent Office 2,799,981
Patented July 23, 1957

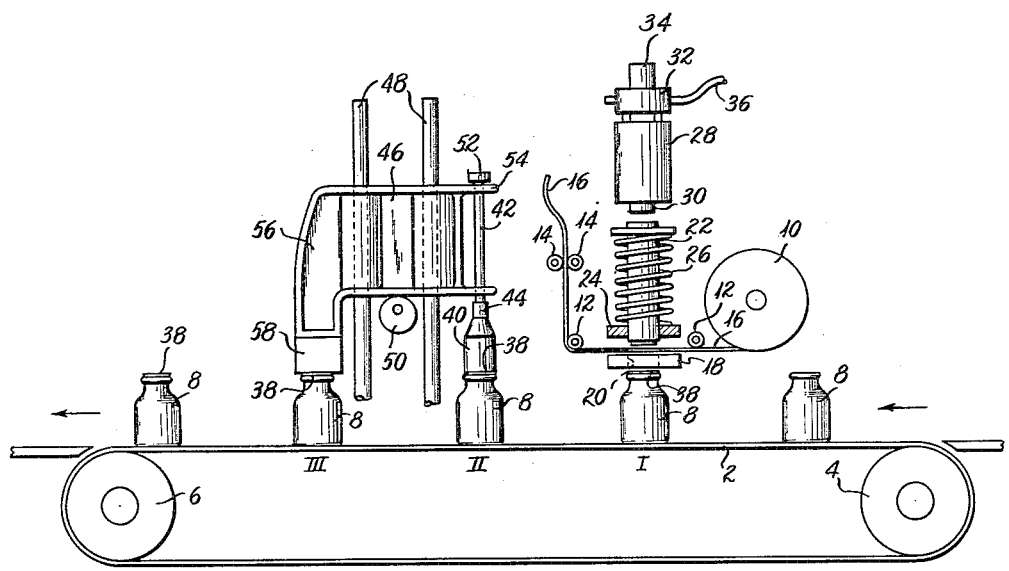

2,799,981

SEALING OF BOTTLES, VIALS AND THE LIKE

Edgar David Stanley Baker-Carr, Cheam, Surrey, and John Leslie Winfield, South Harrow, Middlesex, England, assignors to Glaxo Laboratories Limited, Greenford, England, a British company Application September 29, 1954, Serial No. 459,202

Claims priority, application Great Britain October 9, 1953

8 Claims. (Cl. 53—39)

This invention is concerned with improvements in or relating to the sealing of bottles, jars, vials and like glass containers and more particularly although not exclusively to such containers as are intended to carry substances where it is of great importance that moisture should be as far as possible completely excluded from the contents, and to methods of sealing them.

In pending application of John Leslie Winfield, Serial No. 409,173, filed February 9, 1954, now U. S. Patent No. 2,783,908, there is described closure means for a bottle, jar, vial or like container, comprising a shoulder or seating within the neck of the container, a stopper member disposed on said seating and of such dimensions that it is flush with or lower than the top edge of said neck and a disc or the like of metallic foil adhesively secured to the upper surface of said neck. According to the said application it is preferred to employ an aluminium foil backed with a heat sealing adhesive composition known per se. This present invention is concerned inter alia with methods of applying foil to such containers and other containers for similar purposes.

Sealed containers of the kind with which this invention is particularly concerned are frequently used for pharmaceutical products and other substances where in addition to the importance of excluding moisture from the contents, it is of the greatest importance that the whole of the filling and packing operations shall be carried out in the cleanest possible conditions, whilst such operations should also be carried out at high speed for economical production.

The use of foil alone for sealing in a process where an adhesive is applied to either the glass or the foil just before the container is capped presents the difficulty that there is a risk of adhesive seeping into the container or of the working conditions being otherwise not sufficiently clean. It is for this reason that we have used adhesive backed foil for sealing purposes.

In general for the application of sealing discs to containers the disc has to be cut from a supply of adhesive backed foil and applied to the upper surface of the neck, heat being required to render the adhesive tacky and to cause it to adhere to the container. Where attempts have been made to seal by cutting out the required disc and applying it directly with a heated die to the neck of the container, we have found that, apparently due to the fact that the neck of the container was cold, an insufficient degree of adhesion was obtained between the glass and the foil.

Again where attempts were made to overcome that problem by heating the vial or container itself and applying the foil disc with a die which cut it from a strip we found that the contents of the container were frequently damaged due to the heat required to bring about adhesion and in cases where a stopper member was used as in our said application there was a danger of this lifting and deforming due to gas expansion within the container.

It is therefore, one object of the present invention to provide a method of sealing containers with metallic foil backed with a heat sealing adhesive which, overcomes the difficulties mentioned, complies with the above stated requirements and results in the production of a sealed container in which the bond between the glass and the foil is such that as compared with present known containers for similar purposes there is substantially complete exclusion of moisture.

According to the present invention we provide a method of applying sealing discs of metal foil having a backing of heat sealing adhesive to glass containers, bottles, vials, jars or the like in which a disc of appropriate size is applied cold to the neck or aperture of a container with sufficient impact to cause it to be lightly attached thereto, said disc is then subjected to heat and pressure for a short time sufficient to render the adhesive tacky and to cause it to adhere to the glass without damaging the contents of the container and thereafter final sealing is effected by the application of pressure applied thereto so as to bring the disc into intimate contact with the whole of the upper surface of the neck or aperture of the container.

We have found that a particularly efficient seal for glass containers and the like can be provided by the use of an aluminium foil backed with a thermoplastic adhesive based on polyisobutylene and rosin and we prefer to employ an adhesive of this type sold under the trademark "Telstic" and according to a further feature of our invention we provide a method of applying sealing discs to containers as set forth above in which the said sealing discs are of metal foil backed with the said adhesive known as Telstic. The method, according to the invention, of sealing containers using Telstic is particularly advantageous as applied to closures as described in said application Serial No. 409,173.

Furthermore, we have found that very advantageous results can be obtained by the methods set forth above in the sealing of containers, jars, vials and the like by applying thereto merely a disc of metal foil backed with the thermoplastic adhesive Telstic. It will be understood that containers as set forth in said application Serial No. 409,173 are primarily for use with pharmaceutical products intended for injection, the stopper being required tightly to accommodate the needle of a hypodermic syringe and to be self-sealing after withdrawal of the needle. Where powders, pills or other products for non-injection purposes are concerned substantially complete moisture proofing of the contents can be obtained by the methods set forth above without the use of a stopper and merely by use of a sealing disc of foil backed with a thermoplastic adhesive.

It will be noted that the method of applying sealing discs according to this invention comprises in effect three steps. The first of these steps consists in applying a disc of appropriate size of the adhesive backed foil to the neck or aperture to be sealed with sufficient pressure to cause it to be lightly secured thereto. We may for this step cut out discs of foil from a strip thereof by means of a punch which is caused to impress the disc on the container with a sharp impact sufficient to cause light surface adhesion of the foil to the glass, sufficient to prevent the disc being displaced as the container passes to a further stage of the sealing process. Again where pre-formed discs of the correct size are fed to a delivery point in succession they may be applied by such a punch or like tool which implants them with a sharp impact on the container.

As an example for a small vial of about 10 ccs. capacity a light punch positioned closely above the neck was allowed to move through about 1/16" to cut out the disc and implant it on the neck of the vial.

The next step in the sealing comprises the application of heat and pressure. We have found it most convenient to use a heated presser member which is allowed to rest on the disc and vial under the influence of gravity only. In one particular example for glass vials of about 10 ccs. capacity an electrically heated pressing iron of 2 lbs. weight heated to about 200° C. was applied under gravity alone, and was left in contact with the foil which was backed with said Telstic adhesive for from 1 to 2 secs.

Finally the disc is again subjected to pressure in order to bring the foil disc into intimate contact with the upper surface of the neck or aperture of the container.

It will be understood that there will usually be irregularities in the surface of the neck or aperture and we prefer therefore to apply this pressure by means of a resiliently mounted pressing member which enables pressure to be applied over the whole surface of disc to bring it in intimate sealing contact with the container. No additional heating is normally necessary for this last step in the sealing process.

It will be understood that the particular preferred times, temperatures and weights referred to above are those appropriate to vials of about 10 ccs. capacity sealed with aluminium foil backed with thermoplastic adhesive known as "Telstic." Where other foils and adhesives are used appropriate variations in those conditions will be required consistent with the particular foil and adhesive used.

The figure of the drawings is a schematic representation of an apparatus by which the method of the present invention may be practiced.

The apparatus shown comprises an endless conveyor 2 trained over suitable rolls 4 and 6, one of which is power drvien in a manner to intermittently advance the conveyor in the direction of the arrows a distance equal to the distance between stations I, II and III, as shown. A series of vials or bottles 8 are delivered to the conveyor 2 in any suitable manner in spaced relation whereby a bottle or vial occupies each of the stations I, II and III each time the conveyor is brought to a stop. A reel 10 supports a supply of ribbon or web material comprising the sealing material of the present invention and from which the web is directed past suitable guide means 12 and through feed rollers 14. Between the guide means 12 the web 16 traverses a path lying above but closely adjacent a die 18 having a die opening 20 therethrough. The die opening 20 is directly above and concentric to the vial 8 occupying station I. A vertically reciprocable punch member 22 is mounted for movement through a fixed guide 24 and is biased by spring 26 to an upward position. A punch actuator comprises a suitable hydraulic cylinder 28 having a vertically reciprocable piston therein (not shown) having a piston rod 30 projecting downwardly from the lower end thereof. A valve 32 may be actuated by a solenoid 34 to admit air under pressure to the cylinder 28, from a source (not shown) through an inlet conduit 36. When air is periodically admitted to the cylinder 28 the piston and rod 30 are driven downwardly in a very rapid manner. The impact of the piston 30 on punch 22 imparts a sharp downward force to the punch sufficient to overcome the resistance of spring 26 and causes the punch to move downwardly through the die opening 20 to shear a sealing disc from the web 16 and carry that disc downwardly to the vial 8. The inertia of the punch 22 is sufficient to not only carry the sheared disc 38 down to the vial 8 but is also sufficient to forcibly press the disc 38 against the top surface of the vial.

Station II is defined by a disc heating and pressing device comprising an electrically heated member 40 mounted on a vertically reciprocable rod 42 by means of a suitable flexible coupling 44. The rod 42 is freely slidable in flange portions of a presser head 46 which is, in turn, slidably mounted on guide rods 48. The presser head 46 is actuated in a vertical direction by a suitable cam 50. The rod 42 is provided with a head 52 at its upper end such that when the presser head 46 is in its lowermost position the weight of the heated presser 40 is applied to the vial 8 at station II and the weight of the member 40 and rod 42 constitute the only pressure applied to the disc 38 at that station. Clearly, upon upward movement of presser head 46 by cam 50, the upper flange 54 engages the head 52 of rod 42 and lifts the heated presser 40 from the vial.

The presser head 46 is of such dimension that a portion 56 thereof overlies station III. A resilient presser member 58, of rubber or the like, is fixed to the portion 56 and moves therewith. The rubber member 58 is of such dimension that it engages and rests on the disc 38 on a vial 8 at station III when the presser head 46 is lowered. The arrangement of parts is such that the cam 50 may lower the presser head 46 to rest completely on the vial 8 at station III and thus the entire weight of the presser head 46 is effective to press the resilient member 58 downwardly on the disc 38. Thus the disc 38 is pressed firmly into complete and intimate contact with the upper surface of the vial 8.

The flexible connection 44 previously referred to is provided so that the heated member 40, which must necessarily be rigid, may assume an angular position whereby to engage the disc 38 at station II throughout its entire surface even though the upper surface of the vial 8 may be somewhat defective or not truly perpendicular to the vertical axis of the vial. Suitable drive means (not shown and which may take any form known to those skilled in the art) are provided to intermittently advance conveyor 2, to periodically actuate solenoid 34 to drive piston rod 30 downwardly, to intermittently actuate feed rollers 14, and to intermittently raise and lower presser head 46 by means of cam 50 all in timed relation so that the punching and applying of the disc 38, the pressing of the disc and heating thereof at station II and the final pressing and sealing at station III all occur during intervals when the vials are stationary at their respective stations.

Various forms of apparatus may be used for carrying out the process according to this invention but we have found that most satisfactory results may be obtained by means of a three station machine in which vials are fed by an endless feeding device to a point beneath a punch where the disc is cut out and applied. The initially capped vial is then moved to a second station where it is then subjected to heat and pressure from an electrically heated pressing iron operating only under gravity for a predetermined time. Thereafter the vials are again automatically moved to a third station where an unheated resilient pressing member finally brings the discs into intimate contact with the container.

It will be understood that the path of movement of vials from one station to the next through such a machine may be curved or linear as required and that the timing can be so arranged as to receive vials singly into the first station whilst acting on more than one vial at a time at subsequent stations.

In order that the efficiency of seals made according to the present invention may be understood and so as to give a measure of the degree of moisture exclusion which it provides the following tests were made. Fifty vials sealed in the manner at present in use and containing calcium chloride were kept for eight weeks at a temperature of 100° F. in a saturated atmosphere and were found to have taken up 13.2 mg. of water.

Fifty vials having closures as described in said application Serial No. 409,173 and sealed according to this invention with discs of aluminium foil backed with the adhesive known as Telstic and also containing calcium chloride were tested under the same conditions and, the water taken up after eight weeks was 0.65 mg.

Further tests were made with vials containing sodium penicillin. The test vials had closures as set forth in said application Serial No. 409,173 and were sealed in accordance with this invention using aluminium foil backed with "Telstic" adhesive. The control vials were made and closed in the manner now in commercial use.

Ten vials containing sodium penicillin were placed in a humid atmosphere at temperature alternating between 104° F. and 68° F. in twelve hourly cycles. After thirty-eight days the test vials were satisfactory and were put under a vacuum in water for five minutes. The seals appeared to be satisfactory and were returned to the original alternating humidity tests. Twenty days later the test vials were again examined.

The penicillin content of seven vials showed no discolouration, three vials had slight discolouration.

The ten control vials fitted with the known commercial closure and also containing sodium penicillin were examined and all were found to be caked and discoloured.

Eight vials were placed in a humidity cabinet at temperatures alternating between 104° F. and 68° F. in twelve hour cycles. Eight vials fitted with the normal commercial seal and filled with sodium penicillin were used as controls. The test was conducted over a period of fifty-eight days.

The test vials showed no discolouration of the penicillin content.

The sodium penicillin in each of the control vials was caked and discoloured.

It will thus be seen that surprisingly satisfactory sealing of containers can be achieved by means of this present invention as applied for instance to closures as disclosed in said application Serial No. 409,173 and that by means of such sealing it is possible for pharmaceutical products and other products to be kept even in humid and tropical conditions for far longer than has hitherto been possible without wastage and deterioration due to ingress of moisture.

It will be understood that we have only described preferred ways of carrying out the method according to the invention and that variations and modifications may be made therein without departing from the scope thereof.

We claim:

1. A method of applying sealing discs of metal foil having a backing of heat sealing adhesive to the end surface of glass containers, bottles, vials, jars or the like comprising the steps of applying a cold disc of appropriate size to the end surface surrounding the aperture of a container with sufficient impact to cause it to be lightly attached thereto, then subjecting said disc to heat and pressure for a short time sufficient to render the adhesive tacky and to cause it to adhere to said surface of the glass without damaging the contents of the container and thereafter effecting a final sealing by the application of pressure thereto so as to bring the disc into intimate contact with the whole said surface of the container.

2. A method as claimed in claim 1 wherein said step of applying said cold disc is performed by cutting said disc out of a strip of such foil by a punch and causing said punch to impress the cut out disc onto the container with a sharp impact sufficient to cause light surface adhesion of the disc to the glass.

3. The method as claimed in claim 1 in which a preformed disc of said foil is applied to a container by a tool which implants it with a sharp impact thereon.

4. A method as claimed in claim 1 in which heat and pressure is applied to the said disc simultaneously by a heated presser member.

5. A method as claimed in claim 4 in which said heated presser member acts on said disc under the influence of gravity alone.

6. A method as claimed in claim 1 in which the said final sealing of the said disc is effected by applying pressure to the whole surface of the disc by means of a resilient pressing member.

7. A method as claimed in claim 1 in which the said discs are of aluminium foil backed with a thermoplastic adhesive based on polyisobutylene and rosin.

8. A method as claimed in claim 7 in which said discs are of aluminium foil backed with an adhesive sold under the trademark "Telstic."

References Cited in the file of this patent

UNITED STATES PATENTS 2,056,720    Gunz _____ Oct. 6, 1936
2,326,722    Burkardt _____ Aug. 10, 1943